United States Patent [19]

Harper et al.

[11] Patent Number: 5,001,876
[45] Date of Patent: Mar. 26, 1991

[54] FLUSH GLASS WINDSHIELD REVEAL MOLDING

[75] Inventors: Michael A. Harper, Madison Heights; Julio Desir, Sr., Inkster, both of Mich.

[73] Assignee: The Standard Products Company, Cleveland, Ohio

[21] Appl. No.: 318,585

[22] Filed: Mar. 3, 1989

[51] Int. Cl.⁵ .............................................. E06B 7/23
[52] U.S. Cl. ........................................ 52/208; 52/400
[58] Field of Search ................. 52/208, 400, 200, 400

[56] References Cited

U.S. PATENT DOCUMENTS

| 2,449,875 | 9/1948 | Gadwallader | 52/208 |
| 2,479,436 | 8/1949 | Vigmostad | 52/208 |
| 2,736,404 | 2/1956 | Clingman | 52/208 |
| 2,763,345 | 9/1956 | Clingman et al. | 52/208 |
| 4,571,278 | 2/1986 | Kundert | 52/746 |
| 4,765,673 | 8/1988 | Frabotta et al. | 52/400 |
| 4,813,733 | 3/1989 | Gustafson et al. | 52/400 |

FOREIGN PATENT DOCUMENTS

| 238427 | 6/1964 | Austria | 52/400 |
| 2818755 | 8/1979 | Fed. Rep. of Germany | 2/ |
| 1394484 | 2/1965 | France | 52/400 |

Primary Examiner—James L. Ridgill, Jr.
Attorney, Agent, or Firm—Harness, Dickey & Pierce

[57] ABSTRACT

A glass reveal molding has a U-shaped clamping portion and an umbrella-shaped crown portion. The clamping portion is positioned on a bevel edge of a glass window or the like to provide a flush appearance with the glass window or the like.

4 Claims, 2 Drawing Sheets

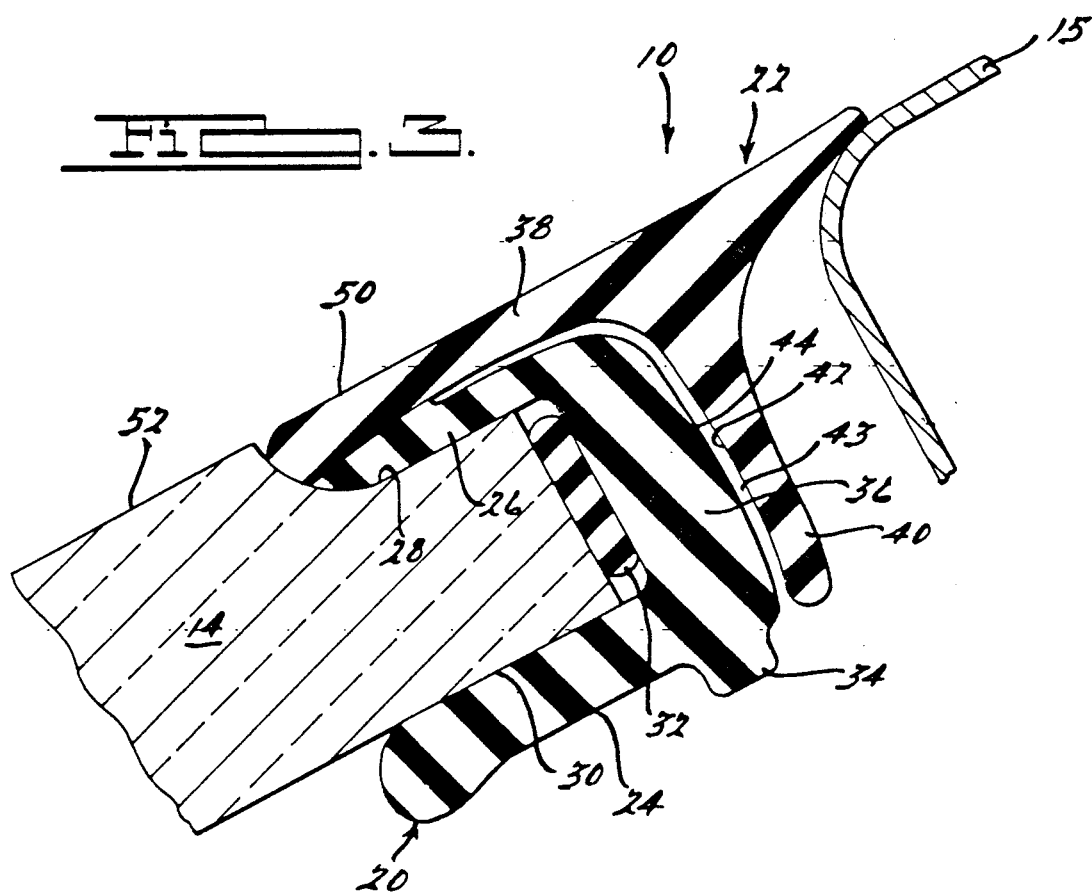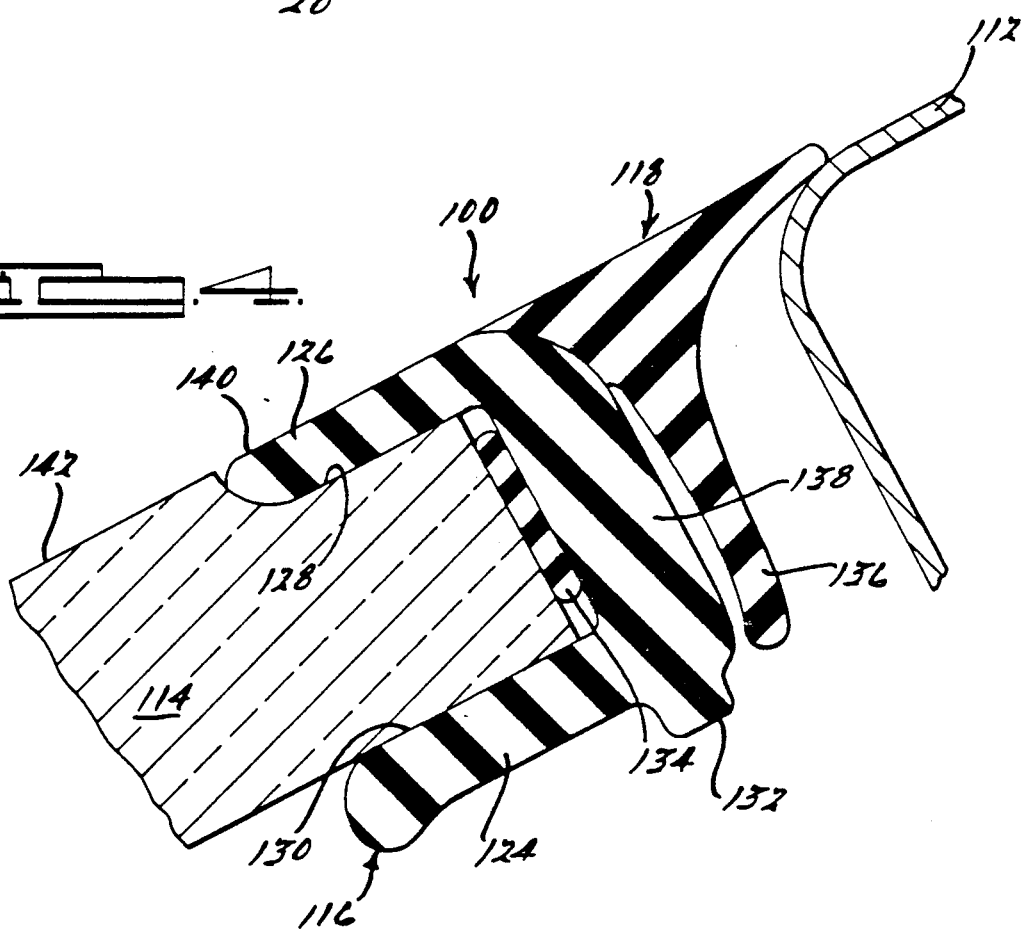

FLUSH GLASS WINDSHIELD REVEAL MOLDING

BACKGROUND AND SUMMARY OF THE INVENTION

The present invention relates generally to edge molding for window panels or the like. More particularly, the present invention relates to a molding for a fixed window of an automobile vehicle such as a windshield, backlite or to a sunroof. The molding bridges the space between the edge of the glass panel and the adjacent body panel while providing the entire assembly with a flush glass appearance.

Automotive windshields, backlites and sunroofs are commonly mounted to the associated vehicle body in a manner which leaves a space between the periphery of the glass panel and the body panel. This space is covered by a molding referred to as a windshield, backlite or sunroof reveal molding. In covering the space between the glass panel and vehicle body, the reveal molding serves to improve the visual appearance of the automotive vehicle and to reduce wind noise.

To present the best visual appearance, reveal moldings must extend evenly around the space between the glass panel and body panel and must be able to accommodate spaces having varying widths. Reveal molding should also be able to curve around the radius of the glass panel without passing from the edge of the panel or twisting to become disengaged from the glass panel or body panel. Reveal molding also should resist fluttering in the relative wind.

Many moldings designed for attachment to the edges of automotive glass are of a single, asymmetrical construction. These moldings generally do not provide a flush appearance. They often project above the surface of the window panel, backlite or sunroof. When such moldings are attached around the radius of a glass panel edge, the clamping pressure of the two opposing molding surfaces is uneven due to the difference of resistance between the mass of material above and below the center axis of the glass. This difference in resistance can cause gapping of one gripper or the other, resulting in a loss of uniform gripping about the radius. Loss of gripping can result in detachment of the molding from the glass edge and a rolling of the molding away from the surface of the glass or from the surface of the vehicle body. This result is unsightly, it defeats the cosmetic function of the molding and increases the possibility of the molding to snag and come out.

In accordance with the present invention, the glass reveal molding has a generally U-shaped clamping portion which exerts substantial even gripping pressure on both top and bottom surfaces of the glass The molding has a crown that is substantially parallel to the legs of the "U" providing a continuous appearance. The glass has a beveled edge which enables one of the legs of the U-shaped clamping portion to seat on the bevel to provide a flush appearance with respect to the glass. Also, the crown includes a stabilizing tail that nests with the U-shaped clamping portion. The tail stabilizer prevents the crown from tilting up or down around the radius of the glass but the stabilizer allows the crown to seat against the vehicle body. This is achieved because the tail stabilizer presses against the U-shaped clamping portion when the molding is applied around a radius. Without the tail stabilizer, the crown would tip up or down when the molding is applied around a glass radius.

Further understanding of the present invention will be had from the following description of the preferred embodiments taken in conjunction with the attached drawings and the appended claims

BRIEF DESCRIPTION OF THE DRAWINGS

FIG. 3 is an enlarged cross-sectional view of a reveal molding of the present invention within Circle 3.

FIG. 4 is a cross-sectional view of an alternative preferred embodiment of a reveal molding of the present invention in place about a windshield.

DESCRIPTION OF THE INVENTION

Figure 1:
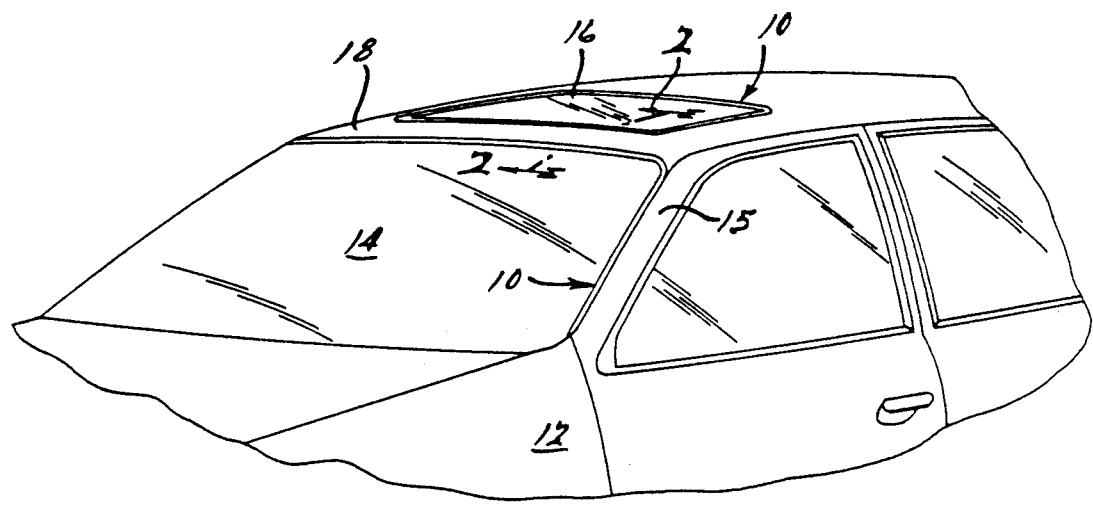
FIG. 1 is a perspective view illustrating the reveal molding of the present invention in place about the periphery of a windshield and sunroof of an automotive vehicle.
Figure 2:
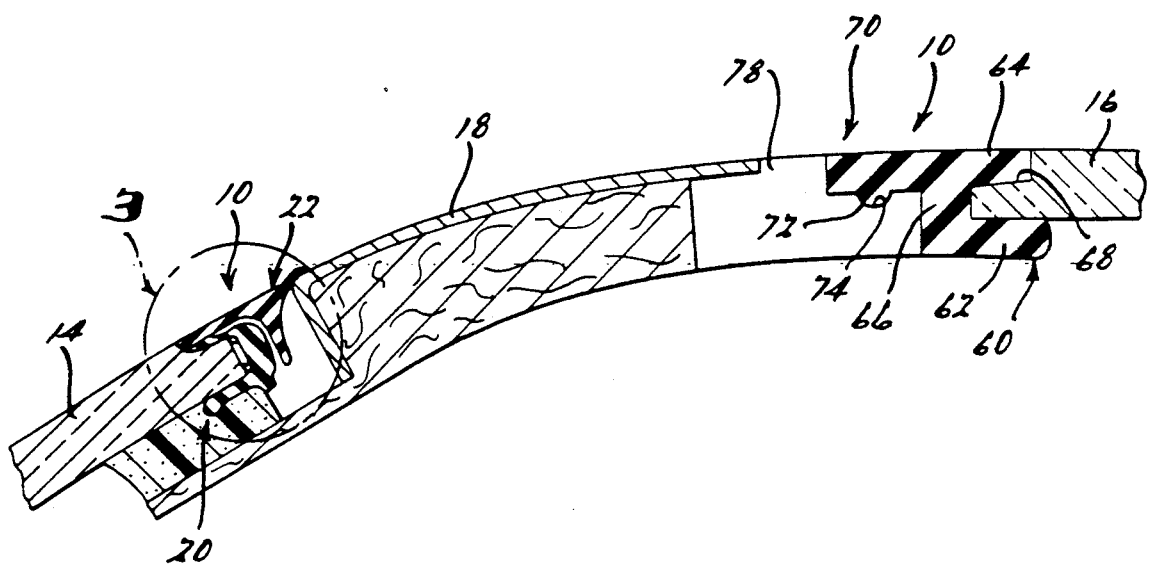
FIG. 2 is a sectional view, broken away, taken along lines 2—2 in FIG. 1 and showing the preferred embodiment of a reveal molding of the present invention.

Referring to the figures, a reveal molding is illustrated and indicated generally by the reference numeral 10. FIG. 1 shows a clamp-on glass molding 10 in operative association with an automobile 12 as a windshield reveal molding. As seen in FIG. 2, the clamp-on glass molding 10 extends around the sides and top of the windshield 14 to cover the space between a conventionally installed windshield and the body panel 15 of the automobile 12. Also, clamp-on glass molding 10 may be modified to fit around the glass panel of a sunroof 16 and modified to attach to the roof panel 18. It will, of course, be appreciated by those skilled in the art that clamp-on glass molding 10 is well suited for use as an automotive windshield reveal molding or backlite reveal molding, but also has molding uses both inside and outside the automotive field.

Clamp-on glass molding 10 is comprised of a suitable elastomeric material and is an elongated molding broadly comprising, in cross-section, a U-shaped clamping portion 20 and a crown 22, both of which may be comprised of polyvinylchloride or other suitable elastomeric material as is common in the art. For example, clamping portion 20 and crown 22 can be co-extruded and comprised of polyvinylchloride of a hardness of durometer shore A 97 and 85, respectively.

U-shaped portion 20 includes legs 24 and 26 positioned on opposite surfaces of the window glass 14. Generally, leg 26 is positioned in beveled edge 28 of the window glass 14. The crown 22 is positioned substantially parallel with the legs 24 and 26. In this position, a substantially equal amount of mass is above and below the central plane of the glass windshield 14, see FIG. 3. This provides for a substantially even clamping pressure by the legs 24 and 26 on opposite surfaces 28 and 30 of the glass 14. The equalized pressure and force of the U-shaped clamping portion 20 reduces the problem of gapping and twisting around the radius of the windshield and enhances retention of the molding on the windshield without rolling or gapping of the molding. Thus, problems with respect to detachment of the molding from the glass edge or a rolling of the molding away from the glass edge are minimized.

An adhesive 32, such as a foamed hot melt adhesive, may be provided for retention of the clamp-on glass molding 10 on the edge of the windshield 14 during subassembly. The U-shaped clamping portion 20 also includes a bottom knob 34. The knob 34 is located on the leg 24 at the junction of the leg 24 with the web 36, which spaces the legs 24 and 26 apart from one another. The knob 34 enables the urethane adhesive used to hold the glass within the opening to mechanically lock the clamp-on glass molding 10 in place when the adhesive 32 sets up.

Crown 22 provides an umbrella-shaped cover which extends across the space between the windshield 14 and the adjacent vehicle body panel 15. The crown 22 must be resilient and flexible so as to maintain an overlaying engagement with the associated vehicle body which may not always be in exact alignment. The crown 22 includes a covering portion 38 which is substantially parallel with the legs 24 and 26. The portion of the covering portion 38 over the leg 26 is of a thickness such that the thickness of the leg 26 and cover portion 38 is substantially equal to the thickness of the bottom leg 24 to provide an equal clamping force as explained above.

Crown 22 also has a stabilizing tail 40 extending downward from the laterally median portion of the crown 22 as viewed in FIGS. 2–4. Tail 40 enhances the resistance of the crown 22 to twisting and hence detachment of the crown 22 from the glass panel or body panel surface. Tail 40 is substantially parallel and adjacent to the web 36 and nests therewith when installed about a windshield. A gap 43 is formed between surface faces 42 of crown 22 and 44 of the web 36 when clamp-on molding 10 is installed. Crown 22 is joined to clamping portion 20 at the end 46 of leg 26 of clamping portion 20. The outwardly facing surface 50 of crown 22 may carry a metalized mylar or other bright work as is conventional in the art.

The outer surface 50 of crown 22 is substantially flush with the outer surface 52 of the glass panel 14. The bevel 28 enables leg 26 and cover portion 38 to be positioned thereon to provide a flush engagement of the outer surface 50 of crown 22 with the outer surface 52 of the glass 14. This flush abutting engagement provides aesthetic enhancement of the glass.

Clamp-on molding 10 is well adapted to be a windshield reveal molding. Clamp-on molding 10 can accommodate uneven edges of glass, as is illustrated in FIGS. 1 and 2, and is commonly found in the art, without becoming twisted or otherwise disengaged. Furthermore, clamp-on molding 10 can be easily installed and is stable once installed to resist disengagement due to temperature extremes, wind or the like. Clamping portion 20 uniformly engages the glass panel edge while crown 22 uniformly covers the space between the glass panel edge and the body panel edge.

Returning to FIG. 2, a clamp-on molding 10 is illustrated secured to a sunroof 16. The molding 10 includes a U-shaped clamping portion 60 with legs 62 and 64 and web 66. The leg 64 is positioned on the bevel 68 of the sunroof 16. The crown 70 is substantially parallel to the leg 64 and continuous therewith. The bottom surface of the crown has a bead 72 which seats in a groove 74 of a sunroof retaining rim 78. The sunroof 16 may be of the horizontal sliding type or of the vertical pop out or adjustable type. The molding of the present invention would work equally as well on either type of sunroof.

Now referring to FIG. 4, an alternate embodiment of the present invention is illustrated and indicated generally by the numeral 100. Clamp-on glass molding 100 is shown in FIG. 4 in operative association with an automotive vehicle body panel 112 and an automotive windshield 114. Clamp-on glass molding 100 broadly comprises a U-shaped clamping portion 116 and a crown 118. U-shaped clamping portion 116 has legs 124 and 126 which have surfaces 128 and 130 clampingly engaging against opposing surfaces of windshield 114. Leg 126 clampingly engages with bevel portion 128 of the glass 114. U-shaped clamping portion 116 is analogous in form and function to clamping portion 20 of clamp-on glass molding 10 and is symmetrical in cross-section with about an equal mass above and below the central plane of the windshield 114. The U-shaped clamping portion 116 includes a bottom knob 132. The bottom knob 132 allows the windshield urethane bead 134 to hold the glass within the opening to mechanically lock the clamp-on glass molding 100 in place when the urethane material sets up.

Crown 118 is generally umbrella shaped and has a stabilizing tail 136 which is substantially parallel with the web 138 of the U-shaped portion 116. The crown 118 joins the U-shaped clamping section at the tail 136. The crown 118 extends from the junction of the leg 126 and web 138 substantially parallel with the leg 126 The outer surface 140 of leg 126 is substantially flush with the glass surface 142 providing a substantially continuous appearance and surface.

While the above description sets forth preferred embodiments of the present invention, it will be apparent to those skilled in the art that the present invention is subject to modification, variation and alteration within the scope and spirit of the following claims.

What is claimed is:

1. In combination with a motor vehicle body, a molding for concealing the space between a body panel and a glass panel, said molding comprising:
   a generally U-shaped clamping portion having inwardly directed clamping legs exerting a clamping force on opposite surfaces of a beveled edge portion of a glass panel such that the leg on said bevel is substantially flush with said glass panel; and a crown having an umbrella-shaped portion and a stabilizing tail portion, said crown being joined to said U-shaped clamping portion with said tail portion in nesting relationship with said U-shaped portion when said molding is in use.

2. The combination as in claim 1 wherein said crown is joined to an end portion of said leg of said U-shaped clamping portion.

3. A molding as in claim 1 wherein said crown umbrella portion is joined at the junction of one of said legs and said web of said U-shaped portion.

4. A molding as in claim 1 wherein said tail portion is substantially parallel and adjacent to said web.

* * * * *

UNITED STATES PATENT AND TRADEMARK OFFICE
CERTIFICATE OF CORRECTION

PATENT NO. : 5,001,876
DATED : March 26, 1991
INVENTOR(S) : Michael A. Harper & Julio Desir, Sr.

It is certified that error appears in the above-identified patent and that said Letters Patent is hereby corrected as shown below:

Column 1, line 55, "glass" should be --glass.--

Column 2, line 6, "claims" should be --claims.--

Column 4, line 30, "126" should be --126.--

Signed and Sealed this

Twenty-fifth Day of January, 1994

Attest:

BRUCE LEHMAN

*Attesting Officer*     *Commissioner of Patents and Trademarks*